United States Patent
Honma et al.

(10) Patent No.: US 10,551,589 B2
(45) Date of Patent: Feb. 4, 2020

(54) LENS DRIVE DEVICE, CAMERA MODULE, AND CAMERA MOUNTING DEVICE

(71) Applicants: Toshihiko Honma, Tokyo (JP); Noriyuki Kobayashi, Tokyo (JP)

(72) Inventors: Toshihiko Honma, Tokyo (JP); Noriyuki Kobayashi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/551,765

(22) PCT Filed: Feb. 17, 2016

(86) PCT No.: PCT/JP2016/000840
§ 371 (c)(1),
(2) Date: Aug. 17, 2017

(87) PCT Pub. No.: WO2016/132740
PCT Pub. Date: Aug. 25, 2016

(65) Prior Publication Data
US 2018/0031801 A1    Feb. 1, 2018

(30) Foreign Application Priority Data
Feb. 20, 2015 (JP) ................. 2015-031703

(51) Int. Cl.
*G02B 7/10* (2006.01)
*G02B 7/08* (2006.01)
(Continued)

(52) U.S. Cl.
CPC ............... *G02B 7/10* (2013.01); *G02B 7/026* (2013.01); *G02B 7/04* (2013.01); *G02B 7/08* (2013.01);
(Continued)

(58) Field of Classification Search
CPC .......... G02B 7/02; G02B 7/021; G02B 7/023; G02B 7/026; G02B 7/04; G02B 7/08; G02B 7/09; G02B 7/10; G02B 7/102
(Continued)

(56) References Cited

U.S. PATENT DOCUMENTS 7,990,631 B2 *   8/2011   Sue ..................... G02B 7/08
                                                    359/811
8,064,153 B2 * 11/2011   Kokichi ............... G02B 7/08
                                                    359/694
(Continued)

FOREIGN PATENT DOCUMENTS

| JP | 2009047935 A | * | 3/2009 |
| JP | 2011-085682 A | | 4/2011 |
| JP | 2013-210550 A | | 10/2013 |

OTHER PUBLICATIONS

English machine translation of JP-2009047935-A (Year: 2009).*
International Search Report from International Application No. PCT/JP2016/000840 dated Mar. 22, 2016.

*Primary Examiner* — Nicholas R. Pasko
(74) *Attorney, Agent, or Firm* — Brundidge & Stanger, P.C.

(57) ABSTRACT

Using drive force from a voice coil motor constituted of an autofocus coil unit and an autofocus magnet unit, a lens drive device automatically carries out focusing by moving an autofocus movable unit, which includes the autofocus coil unit, with respect to an autofocus fixed unit, which includes the autofocus magnet unit, in the direction of an optical axis. The autofocus movable unit has a lens holder that holds the autofocus coil unit. The lens holder has a cut-out part recessed on the inside in the radial direction from the outer periphery of the holder, and a binding part that protrudes to the outside in the radial direction from the cut-out part and binds an end part of the autofocus coil unit.

(Continued)

The tip of the binding part is positioned to the inside of the outer periphery of the holder in the radial direction.

7 Claims, 8 Drawing Sheets

(51) Int. Cl.
    *G02B 7/02*     (2006.01)
    *G02B 7/04*     (2006.01)
    *G02B 7/09*     (2006.01)
    *G03B 3/10*     (2006.01)
    *H02K 41/035*     (2006.01)

(52) U.S. Cl.
    CPC ................. *G02B 7/09* (2013.01); *G03B 3/10* (2013.01); *G03B 2205/0007* (2013.01); *G03B 2205/0069* (2013.01); *H02K 41/0356* (2013.01)

(58) Field of Classification Search
    USPC ................................ 359/819, 822, 823, 824
    See application file for complete search history.

(56) References Cited

U.S. PATENT DOCUMENTS

| | | | |
|---|---|---|---|
| 8,107,176 B2* | 1/2012 | Takei | ................ G02B 7/08 359/811 |
| 2013/0050828 A1 | 2/2013 | Sato et al. | |
| 2013/0221765 A1* | 8/2013 | Chou | ................ H02K 41/0356 310/12.16 |

\* cited by examiner

LENS DRIVE DEVICE, CAMERA MODULE, AND CAMERA MOUNTING DEVICE

TECHNICAL FIELD

The present invention relates to an auto-focusing lens driving device, a camera module having an autofocus function, and a camera mounting device.

BACKGROUND ART

In general, a small-sized camera module is mounted in mobile terminals such as smartphones. A lens driving device having an autofocus function of automatically performing focusing for capturing a subject (hereinafter referred to as "AF (Auto Focus) function") is applied in such a camera module.

The auto-focusing lens driving device (hereinafter referred to as "AF lens driving device") includes, for example, an auto-focusing coil part (hereinafter referred to as "AF coil part") disposed at the periphery of a lens part, and an auto-focusing magnet part (hereinafter referred to as "AF magnet part") disposed to be radially spaced apart from the AF coil part. An autofocus movable part (hereinafter referred to as "AF movable part") including the lens part and the AF coil part is moved with respect to an autofocus fixing part (hereinafter referred to as "AF fixing part") including the AF magnet part in the light axis direction by use of a driving force of a voice coil motor composed of the AF coil part and the AF magnet part, so that automatic focusing is performed (for example, Patent Literature (hereinafter, referred to as "PTL") 1).

In a case where the AF movable part includes a lens holder configured to house the lens part and including the outer peripheral surface on which the AF coil part is disposed, the lens holder is provided with tying parts to which ends of the AF coil part are tied. These tying parts, when formed in such a manner as to protrude in the height direction (light axis direction) of the lens driving device, cause an increase in the overall height of the lens holder and thereby constitute a factor obstructing achievement of height reduction of the lens driving device. In addition, in a case where the AF fixing part includes a base member disposed to be spaced apart from the lens holder on the image formation side in the light axis direction, tying parts formed in such a manner as to protrude on the image formation side in the light axis direction also obstruct achievement of height reduction of the lens driving device since it is necessary to secure a suitable distance between the lens holder and the base member spaced apart from each other. Accordingly, the height reduction of the lens driving device has conventionally been achieved by forming the tying parts such that the tying parts radially outwardly protrude (for example, PTL 2).

CITATION LIST

Patent Literature

PTL 1
Japanese Patent Application Laid-Open No. 2013-210550
PTL 2
Japanese Patent Application Laid-Open No. 2011-85682

SUMMARY OF THE INVENTION

Technical Problem

In a case where tying parts radially outwardly protrude beyond the holder outer periphery of a lens holder, as in the case of a lens driving device disclosed in PTL 2, however, it is necessary to secure a space for disposition of the tying parts, so that achievement of space saving is obstructed and such a lens driving device is not also resistant to external impact caused, for example, by being dropped.

An object of the present invention is to provide a lens driving device in which space saving can be achieved and which is excellent in impact resistance, a camera module including such a lens driving device, and a camera mounting device.

Solutions to Problems

A lens driving device according to the present invention includes an auto-focusing coil part disposed at a periphery of a lens part, and an auto-focusing magnet part disposed to be radially spaced apart from the auto-focusing coil part, the lens driving device being configured to automatically perform focusing by moving, with respect to an autofocus fixing part including the auto-focusing magnet part, an autofocus movable part including the auto-focusing coil part in a light axis direction by use of a driving force of a voice coil motor composed of the auto-focusing coil part and the auto-focusing magnet part, in which: the autofocus movable part includes a lens holder which holds the auto-focusing coil part, the lens holder includes a cutout portion radially inwardly recessed from a holder outer periphery and a tying part which radially outwardly protrudes from the cutout portion and to which an end of the auto-focusing coil part is tied, and a tip of the tying part is located radially inside the holder outer periphery of the lens holder.

A camera module according to the present invention includes the lens driving device as described above, a lens part mounted on the autofocus movable part, and an imaging part configured to capture a subject image imaged by the lens part.

A camera mounting device according to the present invention is an information device or a transporting device, and includes the camera module as described above.

Advantageous Effects of Invention

According to the present invention, it is possible to achieve space saving and to improve impact resistance to external impact caused, for example, by being dropped since a tying part to which an end of an auto-focusing coil part is connected does not radially outwardly protrude beyond the holder outer periphery of a lens holder.

DESCRIPTION OF EMBODIMENTS

Hereinafter, an embodiment of the invention is described in detail based on the drawings.

Figure 1A:
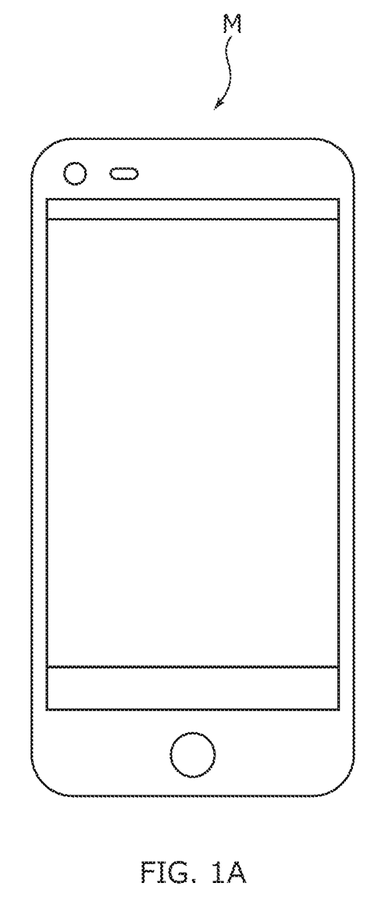
FIGS. 1A and 1B illustrate a smartphone in which a camera module according to an embodiment of the present invention is mounted.
Figure 1B:
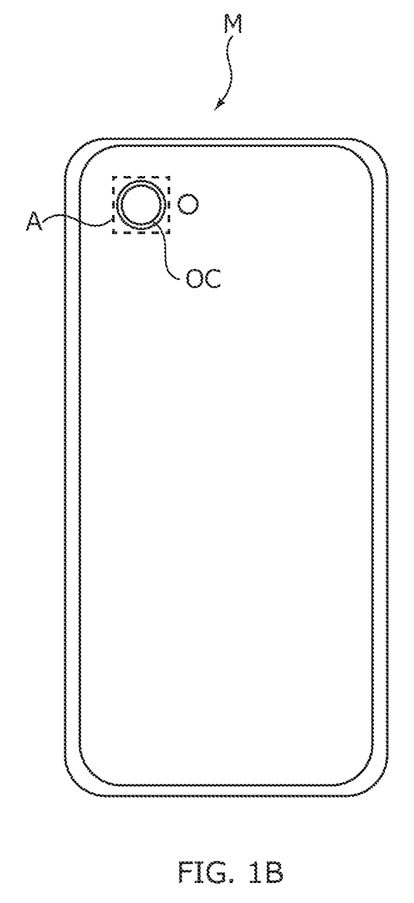

FIGS. 1A and 1B illustrate smart phone M (camera mounting device) in which camera module A according to an embodiment of the present invention is mounted. FIG. 1A is a front view of smart phone M, and FIG. 1B is a rear view of smart phone M.

Smart phone M is provided with camera module A, for example as back side camera OC. Camera module A has an autofocus function, and automatically performs focusing in capturing a subject.

Figure 2:
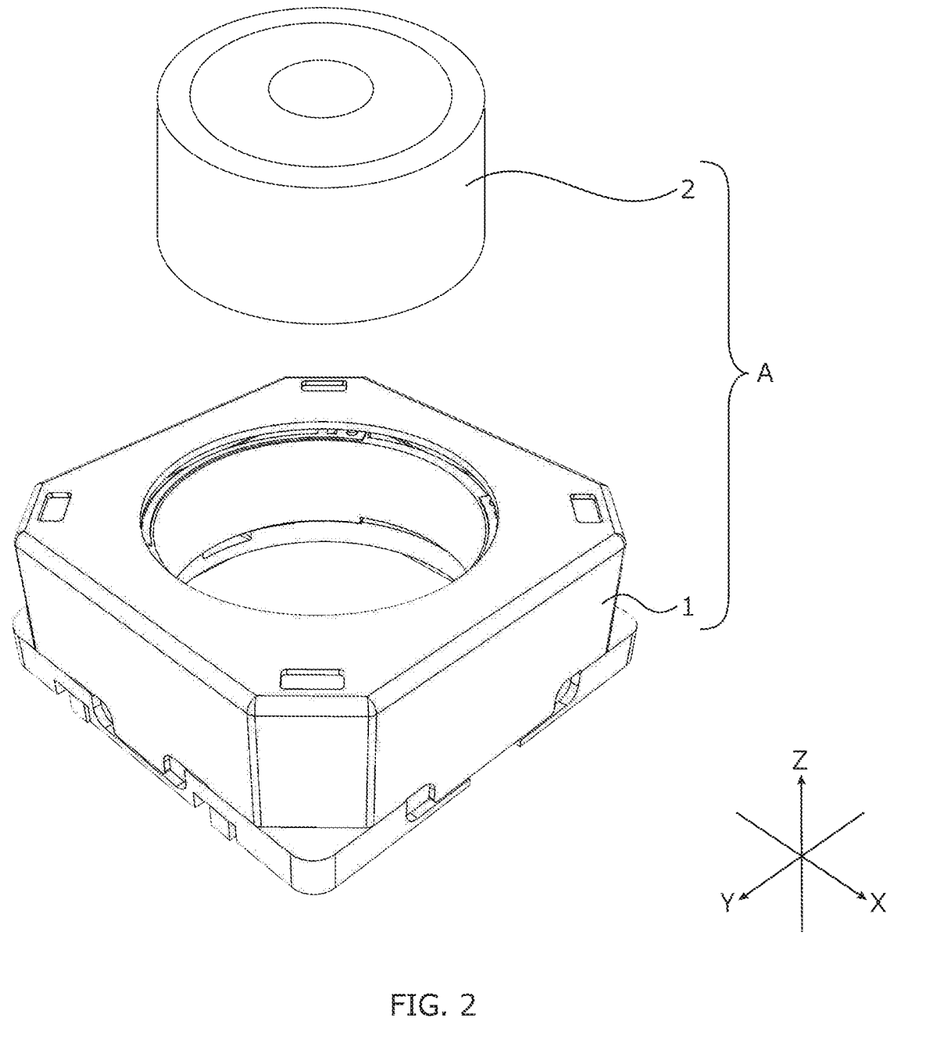
FIG. 2 is an exploded perspective view of a camera module.
Figure 3:
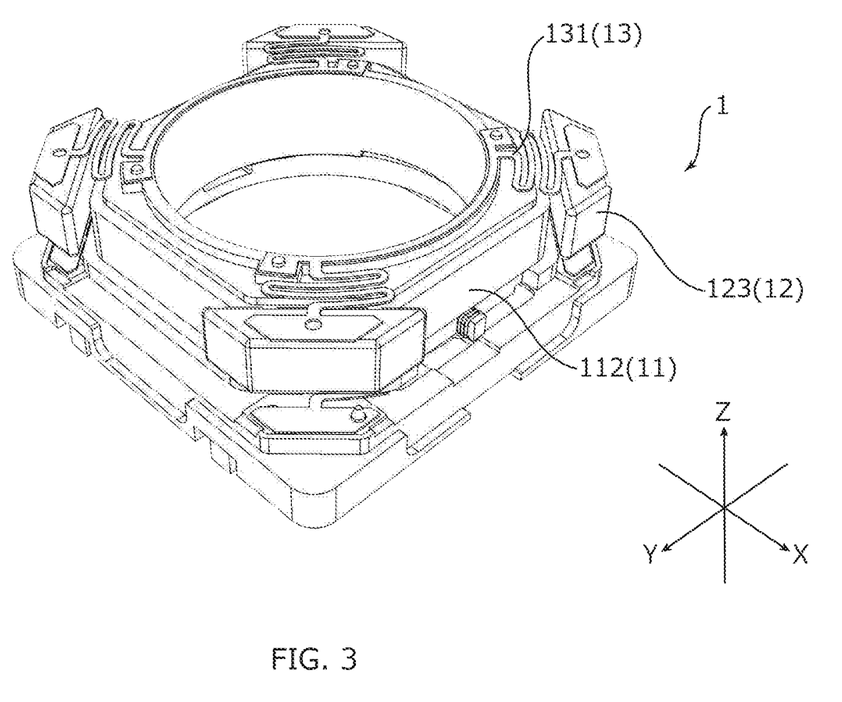
FIG. 3 illustrates the internal structure of a lens driving device.

FIG. 2 is a perspective view of an external appearance of camera module A. FIG. 3 illustrates the internal structure (state in which cover 122 is removed) of lens driving device 1. As illustrated in FIGS. 2 and 3, descriptions will be given for the present embodiment with an orthogonal coordinate system (X, Y, Z). In below-mentioned figures, descriptions will also be given with the orthogonal coordinate system (X, Y, Z). Camera module A is mounted such that the vertical direction (or horizontal direction) is the X direction, the horizontal direction (or vertical direction) is the Y direction, and the front-rear direction is the Z direction during actually capturing an image with smartphone M. That is, the Z direction is the light axis direction, the upper side in the figures (the tip side of the Z-direction arrow) is the light reception side in the light axis direction (also referred to as "macro position side"), and the lower side (the base end side of the Z-direction arrow) is the image formation side in the light axis direction (also referred to as "infinity position side").

As illustrated in FIG. 2, camera module A includes lens part 2 composed of a cylindrical lens barrel and a lens housed therein, lens driving device 1, and the like. Lens part 2 is, for example, adhesively fixed to lens holder 111 (see FIG. 4) in lens driving device 1.

Lens driving device 1 is an auto-focusing actuator which moves lens part 2 in the light axis direction for focusing. Lens driving device 1 includes AF movable part 11, AF fixing part 12, and elastic supporting part 13. AF movable part 11 is elastically connected to AF fixing part 12 by elastic supporting part 13.

AF movable part 11 includes AF coil part 112 disposed at the periphery of lens part 2. AF fixing part 12 includes AF magnet part 123 disposed to be radially spaced apart from AF coil part 112. Lens driving device 1 performs focusing by moving AF movable part 11 with respect to AF fixing part 12 in the light axis direction by use of a driving force of a voice coil motor composed of AF coil part 112 and AF magnet part 123. That is, the moving-coil system is employed in lens driving device 1.

Figure 4:
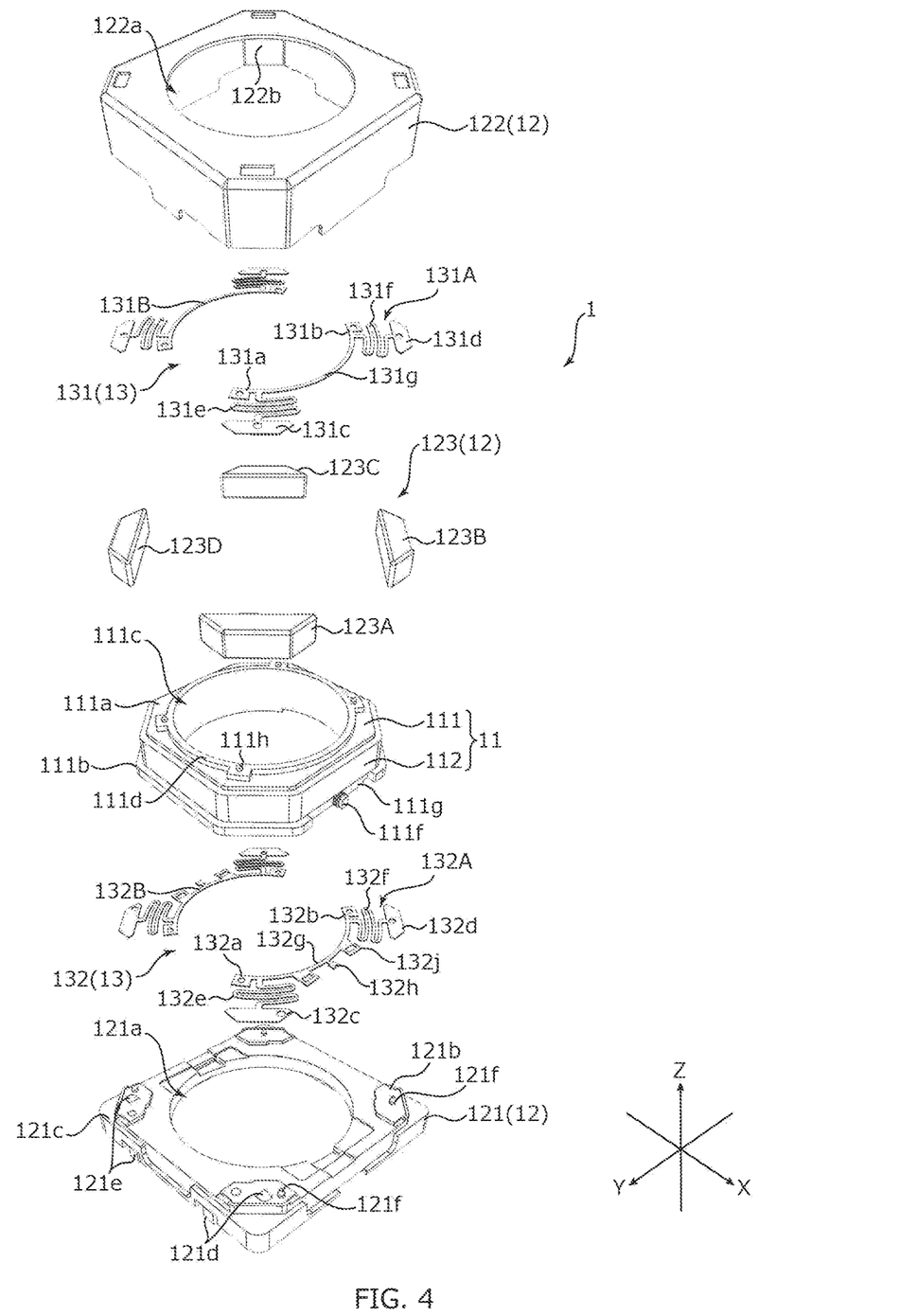
FIG. 4 is an exploded perspective view of the lens driving device.
Figure 5:
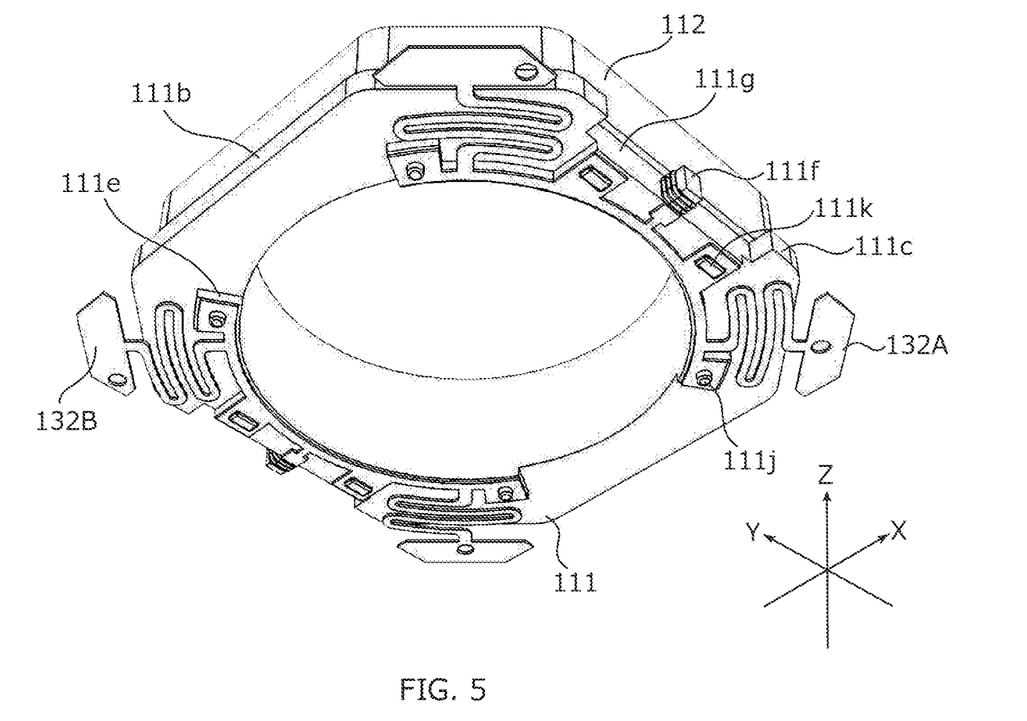
FIG. 5 is a lower perspective view of a lens holder and a lower elastic supporting member.

FIG. 4 is an exploded perspective view of lens driving device 1. FIG. 5 is a lower perspective view of lens holder 111 and lower elastic supporting member 132. As illustrated in FIGS. 4 and 5, lens driving device 1 includes cover 122, upper elastic supporting member 131, AF magnet part 123, lens holder 111, AF coil part 112, lower elastic supporting member 132, base member 121, and the like.

In the present embodiment, lens holder 111 and AF coil part 112 constitute AF movable part 11. Base member 121, cover 122, and AF magnet part 123 constitute AF fixing part 12. Upper elastic supporting member 131 and lower elastic supporting member 132 constitute elastic supporting part 13.

Lens holder 111 includes drum portion 111a around which AF coil part 112 is wound, and lower flange 111b radially outwardly protruding from drum portion 111a. Drum portion 111a and lower flange 111b have a square shape in plan view whose corners are cut off, that is, an octagonal shape formed by alternating short and long sides. Each of four long side portions is parallel to the X or Y direction, and shorter side portions intersect the X and Y directions at an angle of 45 degrees.

Lens holder 111 includes cylindrical lens housing 111c extending through from drum portion 111a to lower flange 111b. Lens part 2 (see FIG. 2) is fixed to this lens housing 111c by adhesion or screwing. Upper circumferential edge 111d of lens housing 111c is formed in such a manner as to protrude upward from the surrounding surface. Upper elastic supporting member 131 is fixed to this upper circumferential edge 111d (hereinafter referred to as "upper spring holding part 111d"). A part of lower circumferential edge 111e (see FIGS. 5 and 6) of lens housing 111c is formed in such a manner as to protrude downward from the surrounding surface. Lower elastic supporting member 132 is fixed to this protruding portion having a circular arc shape (hereinafter referred to as "lower spring holding part 111e").

Lens holder 111 includes tying parts 111f to which ends of AF coil part 112 are tied. Tying parts 111f are respectively provided in the middle of cutout portions 111g along the length direction of cutout portions 111g formed at two opposite sides of lower flange 111b, and tying parts 111f are provided therein in such a manner as to radially outwardly protrude. By forming tying parts 111f in the radial direction instead of in the height direction, height reduction of lens driving device 1 can be achieved.

AF coil part 112 is an air core coil to be energized at the time of focusing, and is wound around drum portion 111a of lens holder 111 at its outer peripheral surface. The ends of AF coil part 112 are tied to tying parts 111f of lens holder 111, and are electrically connected to lower elastic supporting member 132 (lower plate springs 132A and 132B).

Cover 122 is a capped rectangular cylindrical member having a square shape in plan view whose corners are cut off, that is, an octagonal shape formed by alternating short and long sides in the same manner as lens holder 111. Cover 122 includes circular opening 122a in the upper surface. Lens part 2 faces outside from this opening 122a. AF magnet part 123 is, for example, adhesively fixed to insides 122b of the four cut-off corner portions (short side portions) of cover 122 (hereinafter referred to as "magnet housing 122b"). Cover 122 is formed of a magnetic material and functions as a yoke. Cover 122 is placed on base member 121 and is, for example, adhesively fixed.

Base member 121 is a member having a square shape in plan view, and includes opening 121a at its center. In camera module A, an image sensor board (image capturing part; not illustrated) which includes an imaging device (not illustrated) is disposed on the image formation side of base member 121 in the light axis direction. The imaging device (not illustrated) is composed of, for example, a CCD (charge coupled device) image sensor, a CMOS (complementary metal oxide semiconductor) image sensor, or the like, and captures a subject image imaged by lens part 2.

Base member 121 includes lower spring holding parts 121b at the positions corresponding to magnet housings 122b of cover 122. Lower spring holding parts 121b are formed in such a manner as to protrude upward from the surrounding surface. Fringe portion 121c of base member 121 including the outside portions of lower spring holding parts 121b has an uneven shape which fits to the lower part of cover 122 (hereinafter referred to as "cover attachment portion 121c"). Cover 122 is placed on and fixed e.g. adhesively to cover attachment portion 121c in a state where cover 122 is positioned by the outer edges of lower spring holding parts 121b.

Terminal metal fixtures 121d and 121e and the like are embedded in base member 121 by insert molding. Terminal metal fixtures 121d and 121e are exposed on lower spring holding parts 121b of base member 121 at their one ends, and exposed on the lower part of base member 121 at their other ends. The one ends of terminal metal fixtures 121d and 121e are electrically connected to lower plate springs 132A and 132B, respectively, and the other ends are electrically connected to a power source line (not illustrated) of the image sensor board (not illustrated).

AF magnet part 123 is composed of four permanent magnets 123A to 123D having a shape of isosceles trapezoid prism. Permanent magnets 123A to 123D each have an external shape which fits to magnet housing 122b of cover 122. Permanent magnets 123A to 123D are magnetized such that a magnetic field radially traversing AF coil part 112 is formed at AF coil part 112. For example, permanent magnets 123A to 123D are magnetized such that the inner periphery side and the outer periphery side of permanent magnets 123A to 123D are set to N pole and S pole, respectively. An AF voice coil motor is composed of AF magnet part 123 and AF coil part 112. Upper elastic supporting member 131 is fixed to the upper surface of AF magnet part 123. The undersurface of AF magnet part 123 faces lower spring holding part 121b of base member 121.

Upper elastic supporting member 131 is a plate spring formed of beryllium copper, nickel copper, stainless steel, or the like. Upper elastic supporting member 131 elastically supports AF movable part 11 (lens holder 111) with respect to AF fixing part 12 (AF magnet part 123). Upper elastic supporting member 131 is sandwiched between AF magnet part 123 and cover 122 when AF magnet part 123 is attached to cover 122.

Here, upper elastic supporting member 131 is composed of two upper plate springs 131A and 131B disposed to be point symmetrical with respect to the Z axis. Upper plate springs 131A and 131B are shaped by being punched out from one sheet metal, for example. For example, upper plate springs 131A and 131B remain coupled at the time of attachment to lens holder 111 and AF magnet part 123, and then an unnecessary portion of upper plate springs 131A and 131B is cut after upper plate springs 131A and 131B are fixed to lens holder 111 and AF magnet part 123, so that upper plate springs 131A and 131 are separated from each other. Since upper plate springs 131A and 131B have the same construction, descriptions about upper plate spring 131B are omitted.

Upper plate spring 131A includes lens-holder holding portions 131a and 131b, magnet holding portions 131c and 131d, and arm portions 131e and 131f. Lens-holder holding portions 131a and 131b are coupled with each other via coupling portion 131g having a circular arc shape extending along upper spring holding part 111d of lens holder 111.

Arm portions 131e and 131f couple lens-holder holding portion 131a with magnet holding portion 131c and lens-holder holding portion 131b with magnet holding portion 131d, respectively. Arm portions 131e and 131f have a winding road shape, and elastically deform when AF movable part 11 moves.

Upper plate spring 131A is positioned with respect to lens holder 111 by fitting positioning bosses 111h of lens holder 111 in fixation holes of lens-holder holding portions 131a and 131b, and is fixed to lens holder 111 by applying an adhesive agent to positioning bosses 111h or by means of thermal caulking of positioning bosses 111h.

Upper plate spring 131A is positioned with respect to permanent magnets 123A and 123B by fitting positioning bosses (not illustrated) formed on the upper surfaces of permanent magnets 123A and 123B in fixation holes of magnet holding portions 131c and 131d, and is fixed to permanent magnets 123A and 123B by applying an adhesive agent to the positioning bosses (not illustrated). When AF movable part 11 moves in the light axis direction, lens-holder holding portions 131a and 131b are displaced along with AF movable part 11.

Lower elastic supporting member 132 has substantially the same construction as upper elastic supporting member 131. That is, lower elastic supporting member 132 is a plate spring formed of beryllium copper, nickel copper, stainless steel, or the like. Lower elastic supporting member 132 elastically supports AF movable part 11 (lens holder 111) to AF fixing part 12 (base member 121).

Here, lower elastic supporting member 132 is composed of two lower plate springs 132A and 132B disposed to be point symmetrical with respect to the Z axis. Lower plate springs 132A and 132B are shaped by being punched out from one sheet metal, for example. For example, lower plate springs 132A and 132B remain coupled at the time of attachment to lens holder 111 and AF magnet part 121, and then an unnecessary portion of lower plate springs 132A and 132B is cut after lower plate springs 132A and 132B are fixed to lens holder 111 and AF magnet part 121, so that upper plate springs 132A and 132B are separated from each other. Since lower plate springs 132A and 132B have the same construction, descriptions about lower plate spring 132B are omitted.

Lower plate spring 132A includes lens-holder holding portions 132a and 132b, base holding portions 132c and 132d, and arm portions 132e and 132f. Lens-holder holding portions 132a and 132b are coupled with each other via coupling portion 132g having a circular arc shape extending along lower spring holding part 111e (see FIGS. 5 and 6) of lens holder 111. Lower plate spring 132A also includes soldering portion 132h and auxiliary holding portions 132j (at two places) which are each formed midway along coupling portion 132g.

Lower plate spring 132A is positioned with respect to lens holder 111 by fitting positioning bosses 111j of lens holder 111 in fixation holes of lens-holder holding portions 132a and 132b and also by fitting positioning bosses 111k of lens holder 111 in fixation holes of auxiliary fixing portions 132j, and is fixed to lens holder 111 by applying an adhesive agent to positioning bosses 111j and 111k or by means of thermal caulking of positioning bosses 111j and 111k.

Soldering part 132h of lower plate spring 132A is located on the base end side of tying part 111f of lens holder 111, and is electrically connected via soldering to AF coil part 112 tied to tying part 111f. Electricity is supplied to AF coil part 112 via lower plate springs 132A and 132B.

When tying part 111f and AF coil part 112 are soldered, an soldering iron tip of a soldering iron is not pressed locally on tying part 111f of lens holder 111, but can be pressed on a boundary between AF coil part 112 and soldering part 132h of lower plate spring 132A from the main body side of lens holder 111. Thermal damage to lens holder 111 is thus reduced remarkably. Accordingly, a material having a comparatively low heat-resistance is also applicable to lens holder 111.

Lower plate spring 132A is positioned with respect to base member 121 by fitting positioning bosses 121*f* of base member 121 in fixation holes of base holding parts 132*c* and 132*d*, and is fixed to base member 121 by applying an adhesive agent to positioning bosses 121*f* or by means of thermal caulking of positioning bosses 121*f*. When AF movable part 11 moves in the light axis direction, lens-holder holding portions 132*a* and 132*b* are displaced along with AF movable part 11.

When automatic focusing is performed in lens driving device 1, AF coil part 112 is energized. When AF coil part 112 is energized, a Lorentz force is generated at AF coil part 112 by interaction between the magnetic field of AF magnet part 123 and the current flowing through AF coil part 112. The direction of the Lorentz force is the direction (the Z direction) orthogonal to the direction of the magnetic field by AF magnet part 123 and the direction of the current flowing through AF coil part 112. Since AF magnet part 123 is fixed, a reactive force acts on AF coil part 112. With this reactive force serving as the driving force of the AF voice coil motor, AF movable part 11 including AF coil part 112 moves in the light axis direction, so that focusing is performed.

Figure 6:
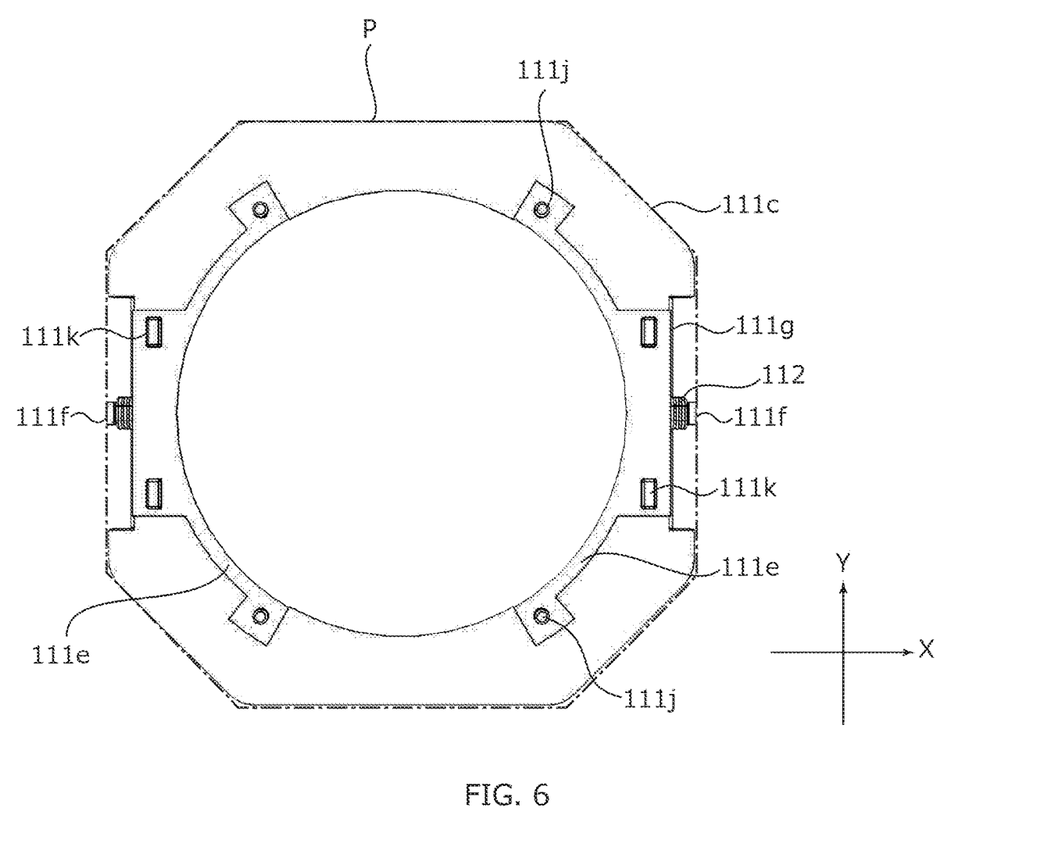
FIG. 6 is a bottom view of the lens holder.

FIG. 6 is a bottom view of lens holder 111. As illustrated in FIG. 6, tying parts 111*f* of lens holder 111 are respectively provided in the middle of cutout portions 111*g* along the length direction of cutout portions 111*g* formed at two opposite sides of lower flange 111*b*. Although tying parts 111*f* radially outwardly protrude from cutout portions 111*g* at which their base ends are located, their tips are located inside holder outer periphery P (long dashed dotted line in FIG. 6) of lens holder 111. Holder outer periphery P is defined by the external shape of lens holder 111 in plan view of when there is no cutout portion 111*g*.

Since tying parts 111*f* do not protrude out of the space for disposition of lens holder 111, it is unnecessary to consider a space for disposition of tying parts 111*f* in designing, and accordingly flexibility in the design improves. In addition, space saving can be achieved in comparison with the conventional case where the tying parts radially outwardly protrude from a holder outer periphery. Furthermore, breakage of tying part 111*f* by external impact can be prevented since external impact caused, for example, by being dropped is not directly applied to tying part 111*f*.

Figure 7A:
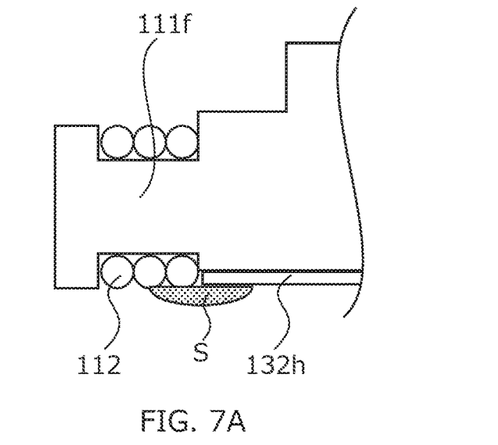
FIGS. 7A to 7C are a sectional view of an exemplary shape of a tying part.
Figure 7B:
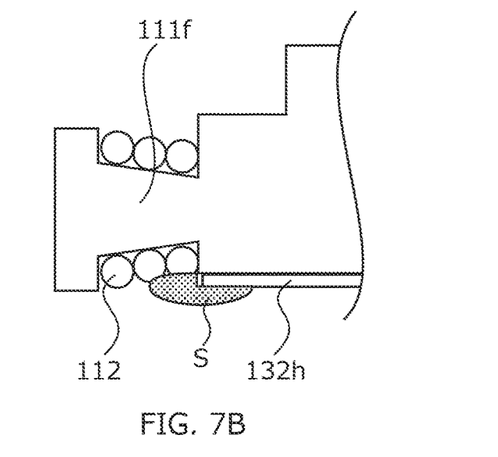
Figure 7C:
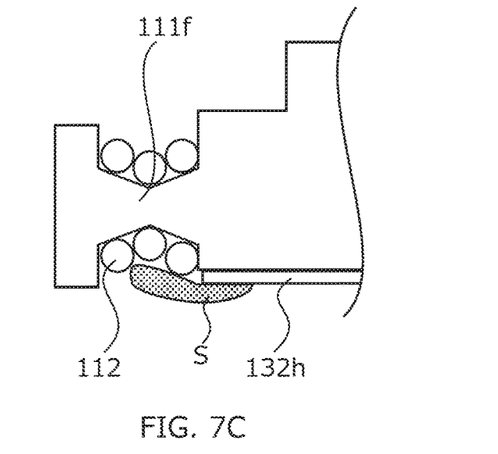

FIGS. 7A to 7C illustrate an example of a sectional shape of tying part 111*f*. In the sectional view along the radial direction, a portion of tying part 111*f* around which AF coil part 112 is wound may have a flat straight cylindrical shape as illustrated in FIG. 7A, a tapered shape as illustrated in FIG. 7B in which the diameter of this portion decreases from the tip side toward the base end side, or a mortar shape as illustrated in FIG. 7C in which the diameter of this portion decreases from the tip side toward the middle and increases from the middle toward the base end side. In the case of the mortar shape illustrated in FIG. 7B or the tapered shape illustrated in FIG. 7C, positional accuracy of AF coil part 112 can be increased in comparison with the shape illustrated in FIG. 7A since solder S can easily enter into a winding portion.

As described above, lens driving device 1 includes AF coil part 112 disposed at the periphery of lens part 2, and AF magnet part 123 disposed to be radially spaced apart from AF coil part 112, and automatically performs focusing by moving, with respect to AF fixing part 12 including AF magnet part 123, AF movable part 11 including AF coil part 112 in the light axis direction by use of a driving force of the voice coil motor composed of AF coil part 112 and AF magnet part 123. AF movable part 11 includes lens holder 111 holding AF coil part 112. Lens holder 111 includes cutout portions 111*g* radially inwardly recessed from holder outer periphery P, and tying parts 111*f* which radially outwardly protrude from cutout portions 111*g* and to which the ends of AF coil part 112 are tied. The tips of tying parts 111*f* are located radially inside holder outer periphery P.

According to lens driving device 1, it is possible to achieve space saving and to improve impact resistance to external impact caused, for example, by being dropped since tying parts 111*f* to which the ends of AF coil part 112 are connected do not radially outwardly protrude beyond holder outer periphery P of lens holder 111.

While the invention made by the present inventor has been specifically described based on the preferred embodiments, it is not intended to limit the present invention to the above-mentioned preferred embodiments and the present invention may be further modified within the scope and spirit of the invention defined by the appended claims.

For example, the external shape of lens holder 111 may be any polygonal shape instead of an octagonal shape or may be a circular shape. In a case where the external shape of lens holder 111 is circular, a cutout portion can be formed along a peripheral surface, and a tying part can be disposed in such a manner as not to protrude beyond a holder outer periphery.

Alternatively, a variation may, for example, be possible in which tying parts 111*f* are disposed to a region of lens holder 111 facing toward the light reception side in the light axis direction, upper elastic supporting member 131 and AF coil part 112 are electrically connected to each other, and electricity is supplied via upper elastic supporting member 131.

The present invention is also applicable to a lens driving device having, along with the AF function, a shake correction function (so-called "OIS (Optical Image Stabilization) function") of optically correcting shake (vibration) upon capturing an image to reduce the irregularities of the image.

While a smartphone serving as a camera-equipped mobile terminal is described in the embodiment as an example of a camera mounting device having camera module A, the present invention is applicable to a camera mounting device serving as an information apparatus or a transport apparatus. The camera mounting device serving as an information apparatus is an information apparatus including a camera module and a control section that processes image information obtained with the camera module, and examples of such a camera mounting device include a camera-equipped mobile phone, a note-type personal computer, a tablet terminal, a mobile game machine, a web camera, and a camera-equipped in-vehicle apparatus (for example, a rear-view monitor apparatus or a drive recorder apparatus). In addition, the camera mounting device serving as a transport apparatus is a transport apparatus including a camera module and a control section that processes an image obtained with the camera module, and examples of such a camera mounting device include an automobile.

Figure 8A:
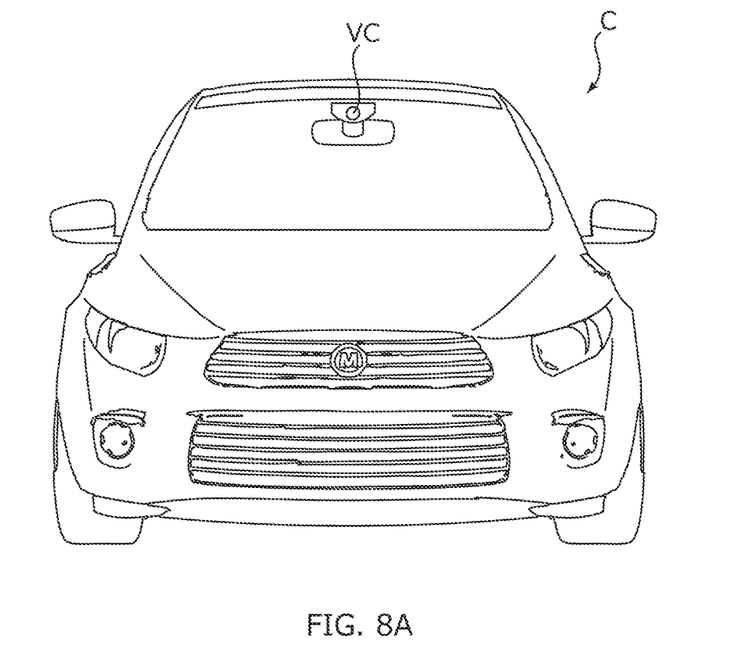
FIGS. 8A and 8B illustrate an automobile in which the camera module is mounted.
Figure 8B:
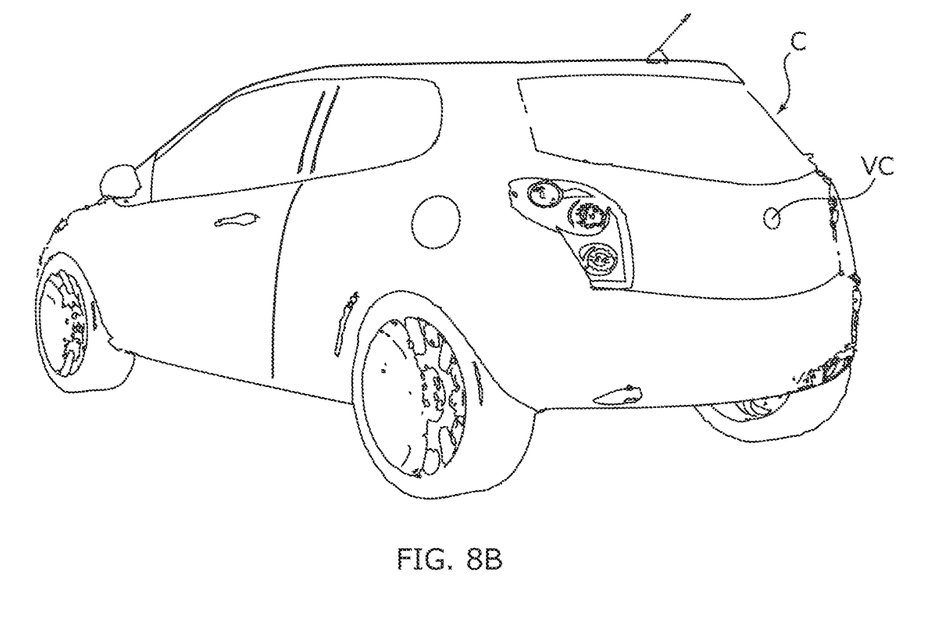

FIGS. 8A and 8B illustrate automobile C serving as a camera mounting device in which an in-vehicle camera module VC (Vehicle Camera) is mounted. FIG. 8A is a front view of automobile C, and FIG. 8B is a rear perspective view of automobile C. In automobile C, camera module A described in the embodiment is mounted as in-vehicle camera module VC. As illustrated in FIGS. 8A and 8B, in-vehicle camera module VC is attached to the windshield so as to face forward, for example, or attached to the rear gate so as to face backward. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. The scope of the present invention is intended to include all modifications in so far as they are within the scope of the appended claims or the equivalents thereof.

This application is entitled to and claims the benefit of Japanese Patent Application No. 2015-031703 dated Feb. 20, 2015, the disclosure of which including the specification, drawings and abstract is incorporated herein by reference in its entirety.

REFERENCE SIGNS LIST

1 Lens driving device
2 Lens part
11 AF movable part
111 Lens holder
112 AF coil part
12 AF fixing part
121 Base member
122 Cover
123 AF magnet part
123A to 123D Permanent magnets
13 Elastic supporting part
131 Upper elastic supporting member
131A, 131B Upper plate spring
132 Lower elastic supporting member
132A, 132B Lower plate spring
M Smart phone (camera mounting device)
A Camera module

The invention claimed is:

1. A lens driving device comprising:
an auto-focusing coil part disposed at a periphery of a lens part; and
an auto-focusing magnet part disposed to be radially spaced apart from the auto-focusing coil part, the lens driving device being configured to automatically perform focusing by moving, with respect to an autofocus fixing part including the auto-focusing magnet part, an autofocus movable part including the auto-focusing coil part in a light axis direction by use of a driving force of a voice coil motor composed of the auto-focusing coil part and the auto-focusing magnet part, wherein:
the autofocus movable part includes a lens holder which holds the auto-focusing coil part,
the lens holder includes: a drum part around which the auto-focusing coil part is wound so as to surround the lens part; a flange part radially outwardly protruding from the drum part; and a tying part to which an end of the auto-focusing coil part is tied,
the tying part is provided in a cutout portion formed in the flange part so as to be radially inwardly recessed,
an outer periphery of the flange part with an exception of the cutout portion is a regular polygon shape or a chamfered regular polygon shape in plain view when viewed along an optical axis direction, and
a tip of the tying part is located radially inside of the outer periphery of the flange part being defined by the regular polygon shape or the chamfered regular polygon shape.

2. The lens driving device according to claim 1, further comprising:
a platelike elastic supporting member elastically connecting the autofocus movable part to the autofocus fixing part, wherein:
the platelike elastic supporting member includes a soldering part soldered to a portion of the auto-focusing coil part tied to the tying part, and
the platelike elastic supporting member is electrically connected to the auto-focusing coil part by the soldering and electricity is supplied to the auto-focusing coil part via the platelike elastic supporting member.

3. The lens driving device according to claim 2, wherein:
the autofocus fixing part includes a base member disposed to be spaced apart from the lens holder on the image formation side in the light axis direction, and
the platelike elastic supporting member connects the base member to the lens holder.

4. The lens driving device according to any one of claims 1 to 3, wherein:
the tying part is tapered in a sectional view along a radial direction such that a diameter of the tying part decreases from a tip side toward a base end side of the tying part.

5. The lens driving device according to any one of claims 1 to 3, wherein:
the tying part has a mortar shape in a sectional view along a radial direction in which a diameter of the tying part decreases from a tip side toward a middle of the tying part and increases from the middle toward a base end side of the tying part.

6. A camera module comprising:
the lens driving device according to claim 1,
a lens part mounted on the autofocus movable part, and
an imaging part configured to capture a subject image imaged by the lens part.

7. A camera mounting device that is an information apparatus or a transport apparatus,
the camera mounting device comprising the camera module according to claim 6.

* * * * *